(12) United States Patent
Wang et al.

(10) Patent No.: US 9,326,270 B2
(45) Date of Patent: Apr. 26, 2016

(54) DATA TRANSMISSION METHOD THROUGH POINT TO MULTI-POINT TRANSMISSION SERVICE

(71) Applicant: Industrial Technology Research Institute, Hsinchu (TW)

(72) Inventors: Yi-Lin Wang, Taipei (TW); Tzu-Ming Lin, Hsinchu County (TW); Chun-Yuan Chiu, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 126 days.

(21) Appl. No.: 14/156,456

(22) Filed: Jan. 16, 2014

(65) Prior Publication Data

US 2014/0198707 A1 Jul. 17, 2014

Related U.S. Application Data

(60) Provisional application No. 61/753,440, filed on Jan. 17, 2013.

(51) Int. Cl.
*H04W 72/00* (2009.01)
*H04W 4/00* (2009.01)
*H04W 72/04* (2009.01)

(52) U.S. Cl.
CPC ............ *H04W 72/005* (2013.01); *H04W 4/005* (2013.01); *H04W 72/042* (2013.01)

(58) Field of Classification Search
CPC .. H04W 72/005; H04W 72/042; H04W 4/005
See application file for complete search history.

(56) References Cited

U.S. PATENT DOCUMENTS

| 2011/0080860 | A1 | 4/2011 | Hsu |
| 2012/0044826 | A1* | 2/2012 | Wang et al. ................... 370/252 |
| 2012/0099509 | A1 | 4/2012 | Ai et al. |
| 2012/0106431 | A1 | 5/2012 | Wu et al. |
| 2012/0282956 | A1 | 11/2012 | Kim et al. |
| 2012/0311101 | A1 | 12/2012 | Chao |

(Continued)

FOREIGN PATENT DOCUMENTS

| CN | 101990166 | 3/2011 |
| EP | 2477423 | 7/2012 |

(Continued)

OTHER PUBLICATIONS

"Office Action of Taiwan Counterpart Application", issued on Apr. 9, 2015, p. 1-p. 13.
3GPP, "3GPP TR 23.768-010, 3rd Generation Partnership Project; Technical Specification Group Services and System Aspects; Study on architecture enhancements to support Group Communication System Enablers for LTE (GCSE_LTE) (Release 12)," Apr. 2013, pp. 1-11.

(Continued)

*Primary Examiner* — Albert T Chou
(74) *Attorney, Agent, or Firm* — Jianq Chyun IP Office

(57) ABSTRACT

The present disclosure proposes a data transmission method through multimedia broadcast multicast services (MBMS). Specifically, the present disclosure proposes using a cell broadcast service to perform data transmission, and the proposed functions would include receiving an information of a service data, allocating a data channel resource based on the information of the service data to generate an allocation information for the data channel, allocating a control channel resource based on the information of the service data to generate an allocation information for the control channel, and transmitting the allocation information for the control channel to a target device.

31 Claims, 18 Drawing Sheets

(56) References Cited

U.S. PATENT DOCUMENTS

2013/0250840 A1* 9/2013 Chen et al. .................. 370/312
2015/0016326 A1* 1/2015 Wang et al. .................. 370/311

FOREIGN PATENT DOCUMENTS

WO  2006118393  11/2006
WO  2008098521  8/2008

OTHER PUBLICATIONS

3GPP, "3GPP TR 23.887 V0.9.0, 3rd Generation Partnership Project; Technical Specification Group Services and System Aspects; Machine-Type and other Mobile Data Applications Communications Enhancements (Release 12)," Apr. 2013, pp. 1-121.

* cited by examiner

|  | BMSC | MBMS GW | MCE | eNodeB |
|---|---|---|---|---|
| Service Identity | Application Identifier | MBMS Session Identifier | M3 signalling connection ID | GTP-U TEID, IP multicast address/M2 signalling connection ID |

FIG. 7

PMCH-InfoList information element

-- ASN1START

```
PMCH-InfoList-r9 ::=                              SEQUENCE (SIZE
(0..maxPMCH-PerMBSFN)) OF PMCH-Info-r9

PMCH-Info-r9 ::=                                  SEQUENCE {
  pmch-Config-r9
  PMCH-Config-r9,
  mbms-SessionInfoList-r9                         MBMS-
SessionInfoList-r9,
    ...
}

MBMS-SessionInfoList-r9 ::=         SEQUENCE (SIZE
(0..maxSessionPerPMCH)) OF MBMS-SessionInfo-r9

MBMS-SessionInfo-r9 ::=                           SEQUENCE {
     tmgi-r9
              TMGI-r9,
     sessionId-r9
        OCTET STRING (SIZE (1))       OPTIONAL,    -- Need
OR
        logicalChannelIdentity-r9                  INTEGER
(0..maxSessionPerPMCH-1),
  groupMessage-r12        GroupMessage-r12        OPTIONAL,  -- Need
OR
     ...
}
GroupMessage-r12                      SEQUENCE {
  groupMessage-Length-r12  INTEGER (1.. maxMCCHMessage-r12) OPTIONAL,
             -- Need OR
  groupMessage-Value-r12   OCTET STRING (SIZE (1..maxMCCHMessage-r12))
}
```

LTE RRC MCCH message-MBSFFNAreaConfiguration

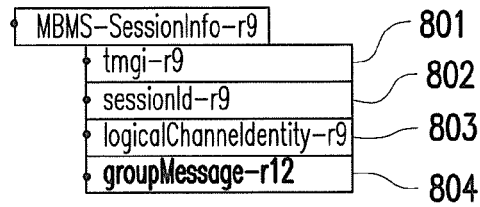

FIG. 8A

MBMSGroupMessage message

-- ASN1START

```
MBMSGroupMessage-r12 ::= SEQUENCE {
  groupMessageList-r12    GroupMessageList-r12,
  lateNonCriticalExtension OCTET STRING OPTIONAL,  -- Need OP
  nonCriticalExtension    SEQUENCE {}              OPTIONAL -- Need OP
}

GroupMessageList-r12 ::= SEQUENCE (SIZE (1.. maxSessionPerPMCH)) OF
GroupMessageInfo-r12

GroupMessageInfo-r12 ::= SEQUENCE {
  tmgi-r9               TMGI-r9,
  sessionId-r9          OCTET STRING (SIZE (1))   OPTIONAL, -- Need OR
  logicalChannelIdentity-r9  INTEGER (0..maxSessionPerPMCH-1) OPTIONAL, -- Need OR
  groupMessageVersion-r12    INTEGER (0.. maxVersion-r12)    OPTIONAL, -- Need OR
  groupMessageData-r12       GroupMessageData-r12            OPTIONAL, -- Need OR
  ...
}
GroupMessageData-r12             SEQUENCE {
GroupMessage-Length-r12          INTEGER (1.. maxMCCHMessage-r12),
GroupMessage-Value-r12           OCTET STRING (SIZE (1..maxMCCHMessage-r12))
}
 -- ASN1STOP
```

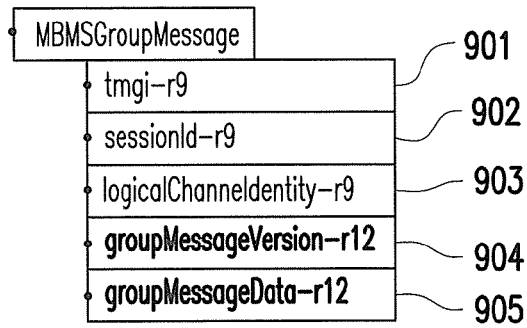

FIG. 9A

DATA TRANSMISSION METHOD THROUGH POINT TO MULTI-POINT TRANSMISSION SERVICE

CROSS REFERENCE TO RELATED APPLICATION

This application claims the priority benefit of U.S.A. provisional application Ser. No. 61/753,440, filed on Jan. 17, 2013. The entirety of the above-mentioned patent application is hereby incorporated by reference herein and made a part of specification.

TECHNICAL FIELD

The present disclosure relates to a data transmission method through a point to multi-point transmission service.

BACKGROUND

The sheer quantity of machine-type communications (MTC) devices, also known as machine-to-machine (M2M) communications device will far exceed devices using human-to-human (H2H)-based communications in the very near future. A MTC application at this present time may already involve more than 1000 subscriptions for a single user, and also a MTC application would generally target a group device. Hence, from vantage point of both a customer and an operator, it would be beneficial to optimize the handling of MTC devices as a group since group based messaging may efficiently distribute the same message, such as a trigger request, to members belonging to a same MTC group located in a particular geographical area in response to a request from a service capability server (SCS). Triggering by groups would substantially reduce the number of triggering messages sent through a network.

One way to implement group based MTC messaging could be to utilize an existing point to multi-point transmission service such as the multimedia broadcast/multicast services (MBMS). As described in 3GPP SA2 TR 23.887, MTC Group Messaging using MBMS is specified in section 8.1.3.2. Accordingly, a network operator could treat a device trigger message as a normal MBMS user message. However, MBMS has conventionally been used for multimedia transmissions. If MBMS were to be utilized to accommodate MTC group messaging features, the MBMS would need to be prepared to receive large quantities of small data as group message. Therefore, enhancing small data transmission through MBMS could be a high priority.

FIG. 1A illustrates a plurality of cells served under a MBMS service area. With MBMS, the same data would be able to be transmitted to multiple devices located within a specific area which would be referred to as a MBMS service area. Under a MBMS service area, there could be one or more MBMS Single-Frequency Network (MBSFN) under which a number of synchronized cells could be covered.

FIG. 1B illustrates a typical MBMS architecture. In the MBMS architecture, there would be a content provider or a MTC server or a GCSE application server which provides a MBMS data directly from the server or through a SCS. The MBMS data from the content provider would be delivered to a Broadcast Multicast Service Center (BM-SC) which would typically be located in a core network and would perform authentication/authorization of the content provider. The BM-SC would then deliver the MBMS data via a SGmb/SGi-mb interface to a MBMS gateway (MBMS-GW) which processes IP-packets from the BM-SC and delivers control information through a Mobility Management Entity (MME) via a M3 interface to a Multi-cell/Multicast Coordination Entity (MCE) in a radio access networks (RAN). In other words, the MBMS data would be delivered through a user plane such as through the M1 interface while control information would be delivered through a control plane such as through a MME, a MCE, and then to an eNB via a Sm interface, M3 interface, and M2 interface respectively. The MCE would coordinate the radio resource according to the received control information within a MBSFN area and in turn would send control signaling to one or more base stations through a M2 interface. The MBMS GW would also send MBMS data directly via M1 to one or more base stations which delivers the MBMS data to UEs under its domain.

FIG. 1C illustrates an example of reading user data from the conventional multicast channels (MCHs) in MBSFN subframe view in accordance with the typical MBMS architecture of FIG. 1B. Currently in a Long Term Evolution (LTE) system, the duration of a radio frame is 10 ms. Here we assume every radio frame would contain 1 MBSFN subframe, and therefore would be a 10 ms interval between two MBSFN subframes. MBSFN data would be transmitted through a MCH which includes a multicast traffic channel (MTCH) transmitting MBMS user data and a multicast control channel (MCCH) transmitting control information including subframe allocation information and modulation and coding schemes. The conventional reading procedure would require a UE to read system information block (SIB) 13 to obtain the multicast control channel (MCCH) configuration in MBSFN-AreaInfo first in order to find the corresponding MCH scheduling information (MSI) which indicates the location of the multicast traffic channel (MTCH) within which any particular MBMS user data would be located, and then a UE would be able to obtain the MBMS user data from the MTCH. A convention MCCH would only contain control information such as MCH configuration which points out how MBMS data could be received in MTCH. Since the MCCH, MTCH, and MSI are all located in the Multimedia Broadcast multicast service Single Frequency Network (MBSFN) subframe which is configured in System information block type 2 (SIB 2), the latency of reading MTCH could be tens or even hundreds of micro seconds delays. As shown in the example of FIG. 1C, reading user data #8 and #10 in response to reading MSI values would require 100 ms and 130 ms respectively.

As Group Communication System Enabler over LTE (GC-SE_LTE) endeavors to develop the critical communication which would involve public safety over the LTE system, the system has been recommended to provide a mechanism to support a group communication end to end setup time of less than or equal to 300 ms, which could prove useful while transmitting urgent information. Therefore, minimizing the latency of reading MTCH could be a crucial step toward minimizing the above mentioned call setup time.

SUMMARY OF THE DISCLOSURE

Accordingly, the present disclosure is directed to a data transmission method through a point to multi-point transmission service.

Specifically, the present disclosure proposes a data transmission method through a point to multi-point transmission service, configured for a network control node, and the method includes receiving an information of a service data, allocating a data channel resource based on the information of the service data to generate an allocation information for the data channel, allocating a control channel resource based on the information of the service data to generate an allocation information for the control channel, and transmitting the allocation information for the control channel to a target device.

The present disclosure proposes a data transmission method using a point to multi-point transmission service through a multicast channel which would include a data channel and a control channel, configured for a base station (BS), and the method would include receiving a user plane data and a control plane data comprising a control information, placing a first data in the data channel according to the control information and placing a second data with the control information in the control channel according to the control information, and transmitting the first data in the data channel and the second data with the control information in the control channel to a user device.

The present disclosure proposes a data transmission method through a point to multi-point transmission service, configured for a user equipment (UE), and the method would include reading broadcasting information from a broadcast channel, receiving a control channel from the broadcasting information, determining a first service data location in the control channel, and receiving the first service data from the control channel.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 7 illustrates using different service identities to split MBMS data into control plane and user plane in accordance with one of the exemplary embodiments of the present disclosure.

FIG. 8A illustrates a new IE in MCCH Message in accordance with one of the exemplary embodiments of the present disclosure.

FIG. 9A illustrates a new MCCH Message in accordance with one of the exemplary embodiments of the present disclosure.

DETAILED DESCRIPTION OF DISCLOSED EMBODIMENTS

Figure 1A:
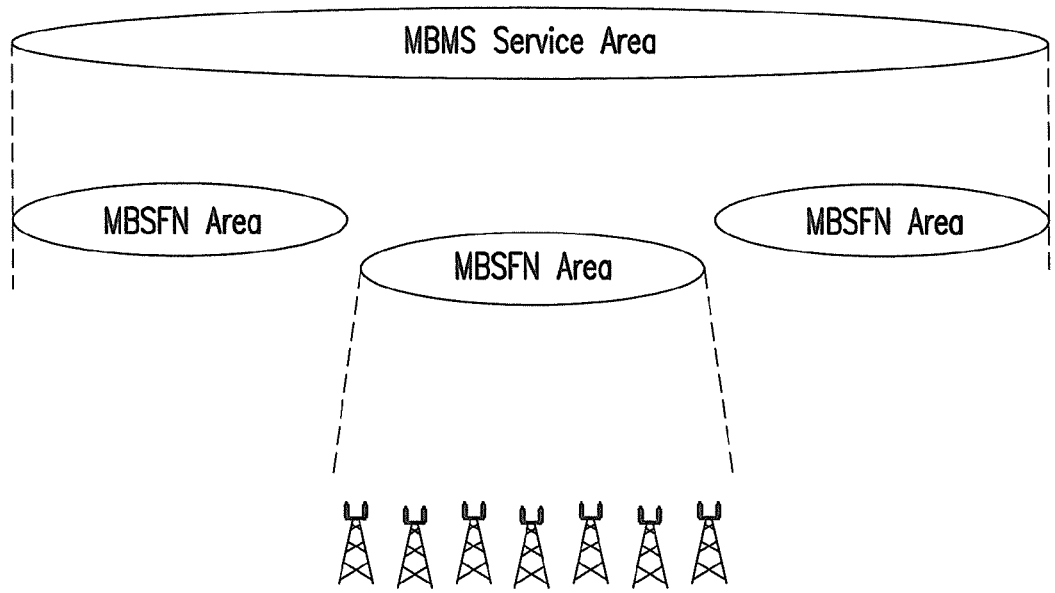
FIG. 1A illustrates an example of a plurality of cells served under a MBMS service area.
Figure 1B:
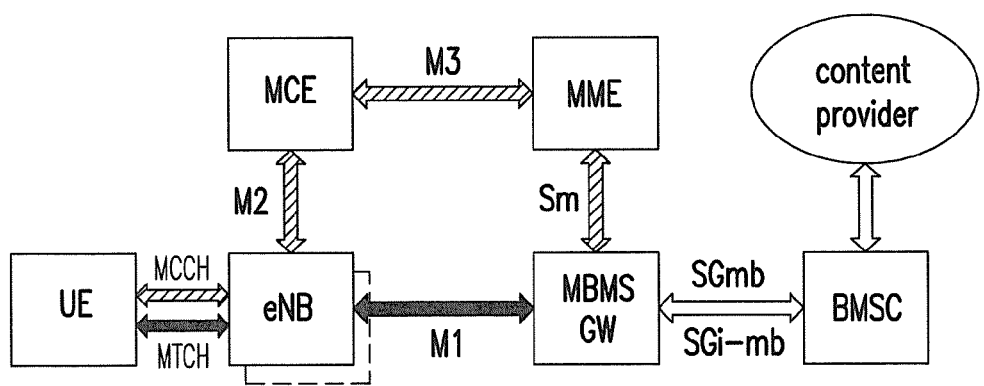
FIG. 1B illustrates a conventional MBMS control structure.
Figure 1C:
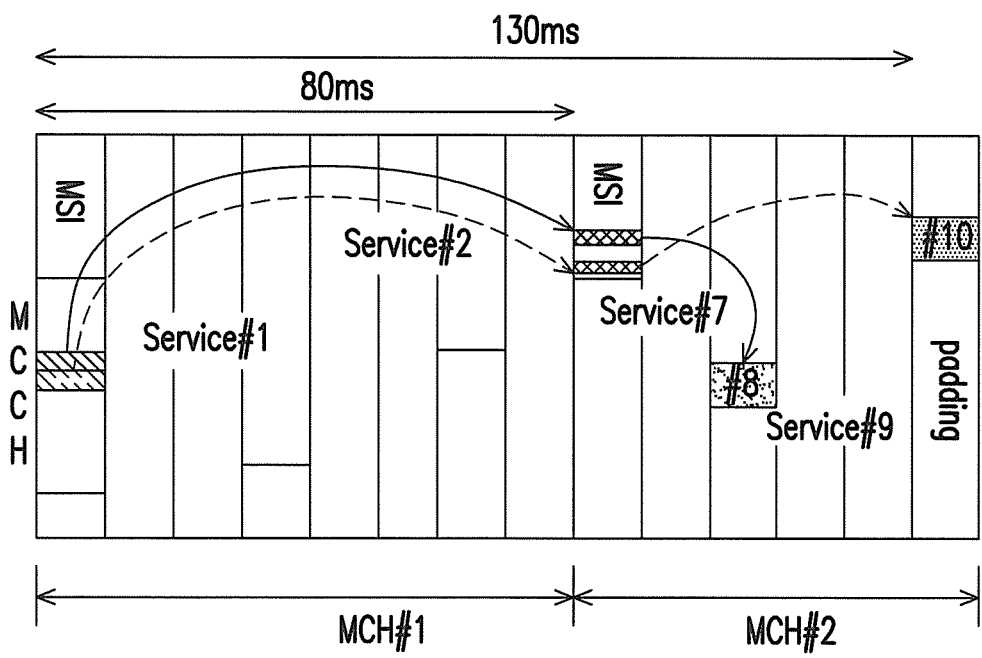
FIG. 1C illustrates an example of MBSFN subframes under the conventional MBMS control structure.

Reference will now be made in detail to the present exemplary embodiments of the disclosure, examples of which are illustrated in the accompanying drawings. Wherever possible, the same reference numbers are used in the drawings and the description to refer to the same or like parts.

In this disclosure, 3GPP-like keywords or phrases such as the MBMS are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art. Thus, MBMS may extend to other types of point to multi-point transmission service used by other types of networks.

Figure 2A:
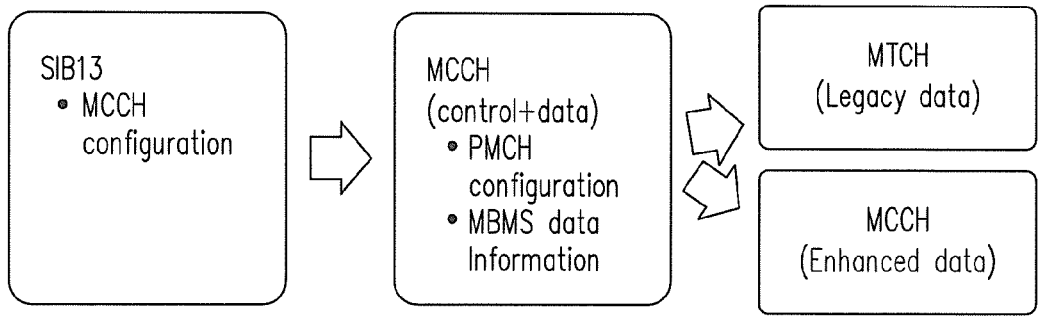
FIG. 2A illustrates a conceptual model of an enhanced MCCH.

FIG. 2A illustrates a conceptual model of an enhanced MCCH. Acquiring MBMS user data in accordance with the present disclosure would require a UE to read SIB 13 in order to obtain MCCH configuration in MBSFN-AreaInfo, and then from the MCCH configuration, the UE could acquire both detailed configuration of PMCH and MBMS data information in the MCCH. There would generally be one specific MCCH per MBSFN area. For a UE under a specific MBSFN area, the PMCH configuration would be the control information which would point out for a UE how to receive MBMS data in MTCH, and the MBMS data information would indicate the length of MBMS data if exists in the MCCH and the exact MBMS data content in the MCCH. The UE could then receive MBMS user data in MTCH and/or MCCH according to the MCCH configuration.

Figure 2B:
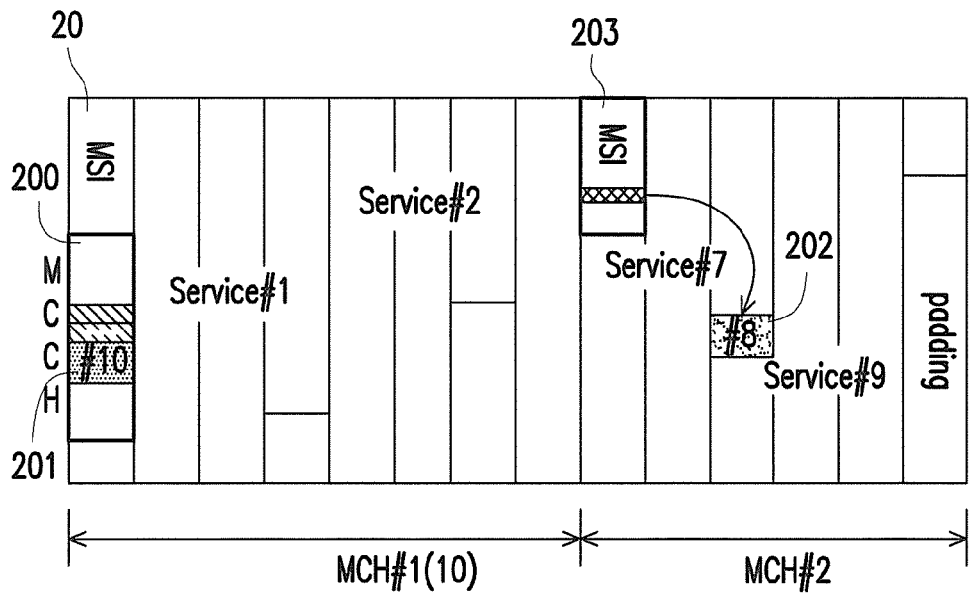
FIG. 2B illustrates resource allocations of MCH subframes with enhanced MCCH in accordance with one of the exemplary embodiments of the present disclosure.

FIG. 2B illustrates resource allocation in exemplary MCH MBSFN subframes with enhanced MCCH. MCH MBSFN subframes would typically be periodic, and thus MCH#1 (10) may include a MSI (20) and a MCCH (200), and MTCH would be the rest of the MCH#1 (10) not including the MSI (20) and the MCCH (200). Assuming that service #10 (201) would be of interest for a UE. For the enhanced method, the MCCH (200) would carry both of the control and data information of service#10 (201) directly in MCCH message. A UE would read the MCCH (200) first and know that the service#10 (201) in its entirety is already located inside the MCCH (200). But to read service#8 (202), the UE would need to read MSI (203) which indicates which subframe is used for service#8 (202), and then the UE would read the corresponding MTCH subframe as indicated by the MSI (203) to locate service #8 (202). Accordingly, the present disclosure would provide the flexibility such that a network could decide to put MBMS data either in the MCCH (200) or MTCH. If the UE is only interested in service#10 (201), the UE would only be required to perform the reading of 1 subframe of the MCH whereas the conventional method would require 3 readings of the MCH, and thus the reading of the subframe would be reduced from 3 subframes to 1 subframe.

Figure 2C:
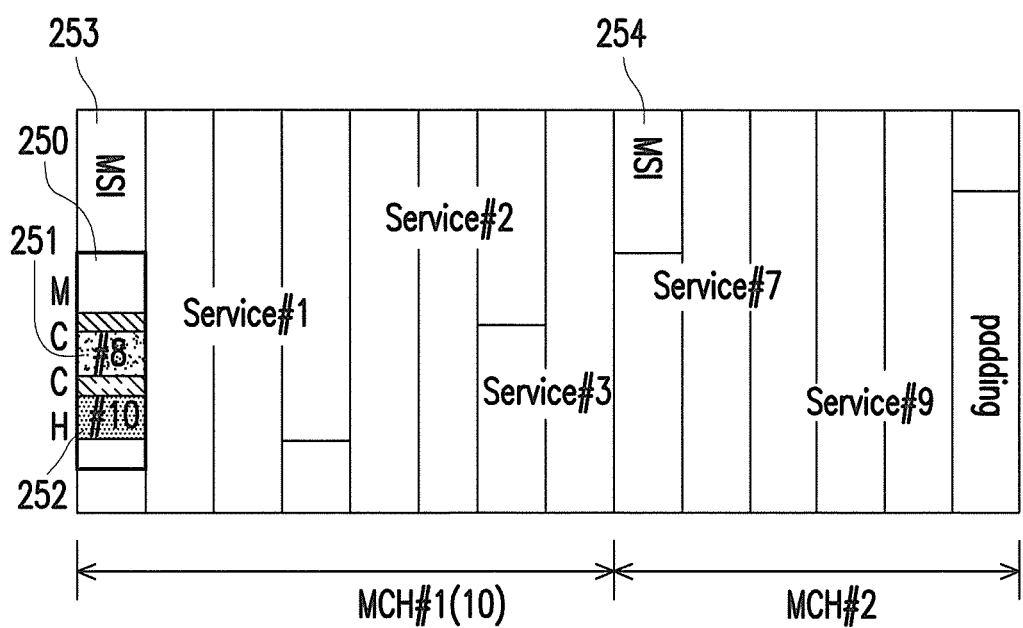
FIG. 2C illustrates resource allocations of MCH subframes with enhanced MCCH in accordance with one of the exemplary embodiments of the present disclosure.

FIG. 2C illustrates resource allocation in another exemplary MCH MBSFN subframes with enhanced MCCH. For the exemplary MCH subframes of FIG. 2C, both service #8 (251) and service#10 (252) would be located within the MCCH (251). Assuming that service#8 (251) and service#10 (252) would be of interest for a UE, the UE would only need to read one subframe to obtain the entirety of service#8 (251) and service#10(252) without reading MSI (254) and MTCH. Therefore, the number of subframes needed to be read was reduced from 4 subframes to 1 subframe. If the MBMS data is too large to across more than one subframe, it still helps to reduce at least one subframe (MSI).

Since the present disclosure proposes allowing MBMS user data to be placed within MCCH and delivered via a control plane, a network operator could choose at least 4 different implementation options according to different requirements and scenarios.

Figure 3A:
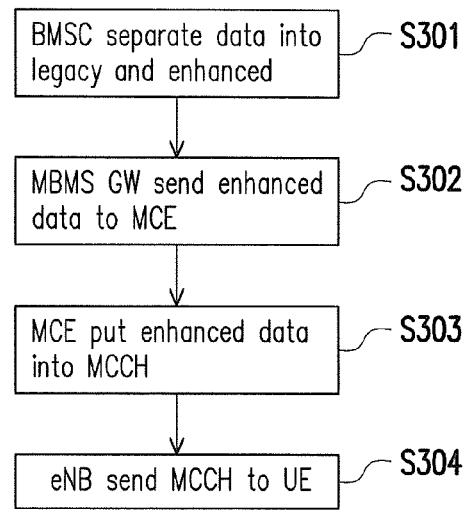
FIG. 3A illustrates an enhanced MCCH procedure based on a BM-SC decision in accordance with one of the exemplary embodiments of the present disclosure.
Figure 3B:
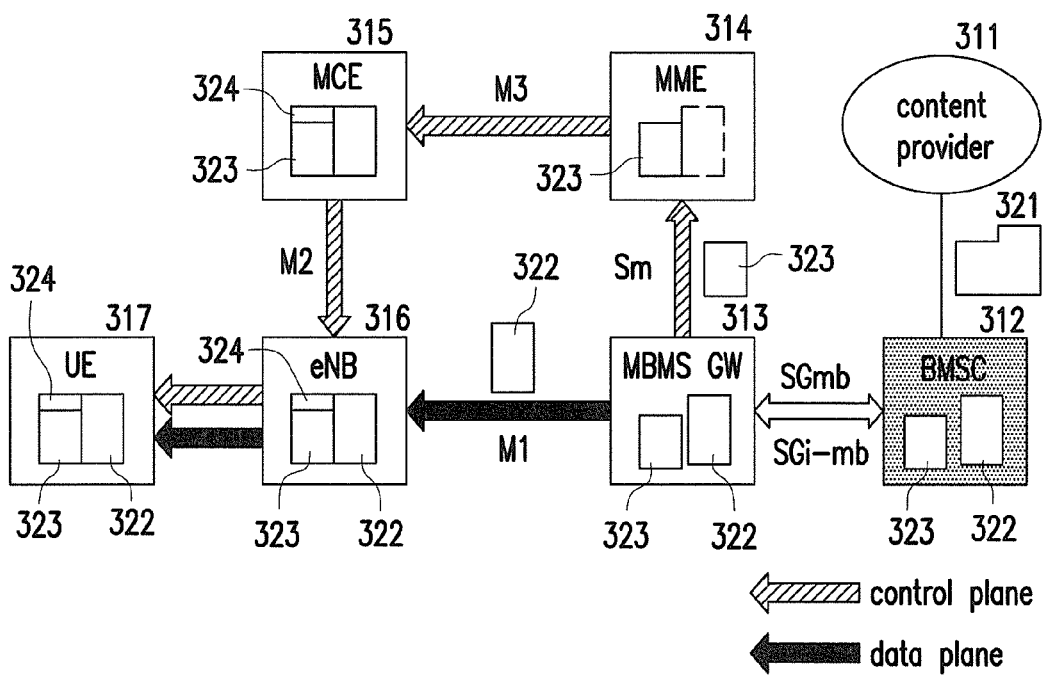
FIG. 3B illustrates the network structure of FIG. 3A.

FIG. 3A illustrates an enhanced MCCH procedure based on a BM-SC decision in accordance with one of the exemplary embodiments of the present disclosure. FIG. 3B illustrates the network structure of FIG. 3A. FIGS. 3A & 3B will be referred together. In step S301, a BM-SC (312) divides MBMS data (321) received from a content provider (311) into a legacy data (322) and an enhanced data (323) and delivers them to a MBMS gateway (MBMS-GW) (313) via a SGmb/SGi-mb interface. In step S302, the MBMS gateway (MBMS-GW) (313) would transmit the enhanced data (323) along with control information related to legacy data through a control plane to a MME 314 via a Sm interface and then to a MCE 315 via a M3 interface; whereas the legacy data (322) would be delivered to an eNB (316) through a user plane via a M1 interface. In step S303, the MCE (315) would merge enhanced data (323) with MCCH control (324) into a MCCH data and deliver the MCCH data to an eNB (316) via a M2 interface. The eNB (316) would then place the legacy data into MTCH and re-assemble the MTCH with MCCH data. In step S304, the eNB (316) would transmit legacy data (322) in MTCH and enhanced data (323) with MCCH control (324) in MCCH configuration to at least one UE (317).

Figure 4A:
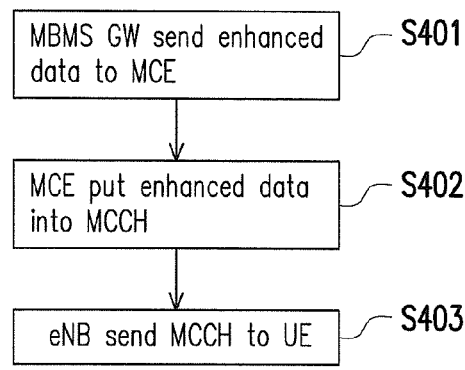
FIG. 4A illustrates an enhanced MCCH procedure based on a MBMS-GW decision in accordance with one of the exemplary embodiments of the present disclosure.
Figure 4B:
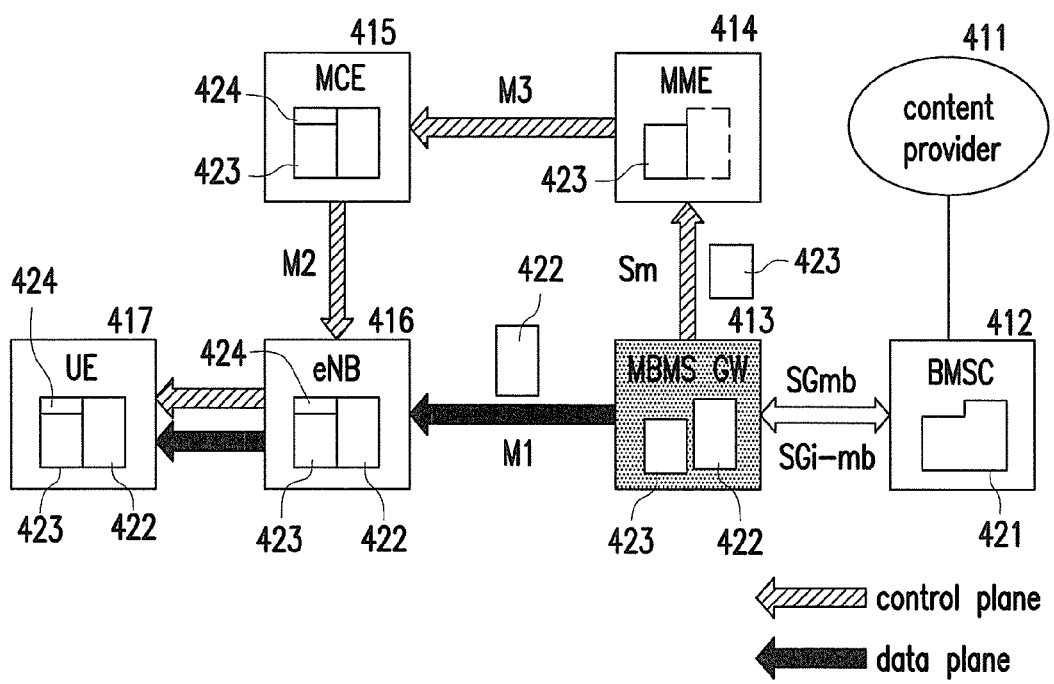
FIG. 4B illustrates the network structure of FIG. 4A.

FIG. 4A illustrates an enhanced MCCH procedure based on a MBMS-GW decision in accordance with one of the exemplary embodiments of the present disclosure. FIG. 4B illustrates the network structure of FIG. 4A, and thus FIGS. 4A & 4B would be referred together. FIGS. 4A & 4B differ from the previous embodiment of FIGS. 3A & 3B in the way that the MBMS GW (413) decides how MBMS data (421) is divided between legacy data and enhanced data. In step S401, the content provider (411) delivers to BMSC (412) MBMS data (421) which would then be delivered to MBMS GW (412) across a SGmb/SGi-mb interface. The MBMS GW (413) would divide the MBMS data (421) into a legacy data (422) and enhanced data (423). The legacy data (422), as its name implies, would be delivered by the MBMS GW (413) through legacy means which in the present disclosure would amount to a portion of the MBMS user data, namely, the legacy data (422) to be delivered to the eNB (416) through the user plane via the M1 interface; whereas, the enhanced data (423) would be delivered by the MBMS GW (413) through the control plane along with control information to the MCE (415) via a M3 interface by the way of the MME (414) via a Sm interface. The control information would include information such as the size of the legacy data (422) and the enhanced data (423). In step S402, the MCE (415) would merge the enhanced data (423) with MCCH control (424) to form MCCH data. In step S403, the eNB (416) would merge legacy data (422), the MCCH data which would include enhanced data (423) and MCCH control (424), and then the eNB (416) would send the totality of said data to the UE 417. In this embodiment, the MBMS GW (413) would be in charge of splitting MBMS data into enhanced data (423) and legacy data (422). For legacy data (422), it would send to eNB (416) across a M1 interface as the legacy mean. For enhanced data (423), the MBMS GW (413) would send via a Sm interface to the MME 414 which would then transmit the data to the MCE (415) so that the MCE (415) would integrate the enhanced data (423) with MCCH control (424) and send them to the eNB (416). The eNB (416) would send both MCCH data and MTCH data to a UE such as UE 417.

Figure 5A:
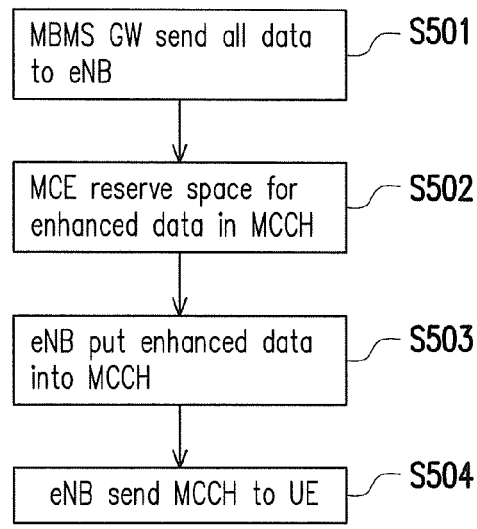
FIG. 5A illustrates an enhanced MCCH procedure based on a MCE-GW decision in accordance with one of the exemplary embodiments of the present disclosure.
Figure 5B:
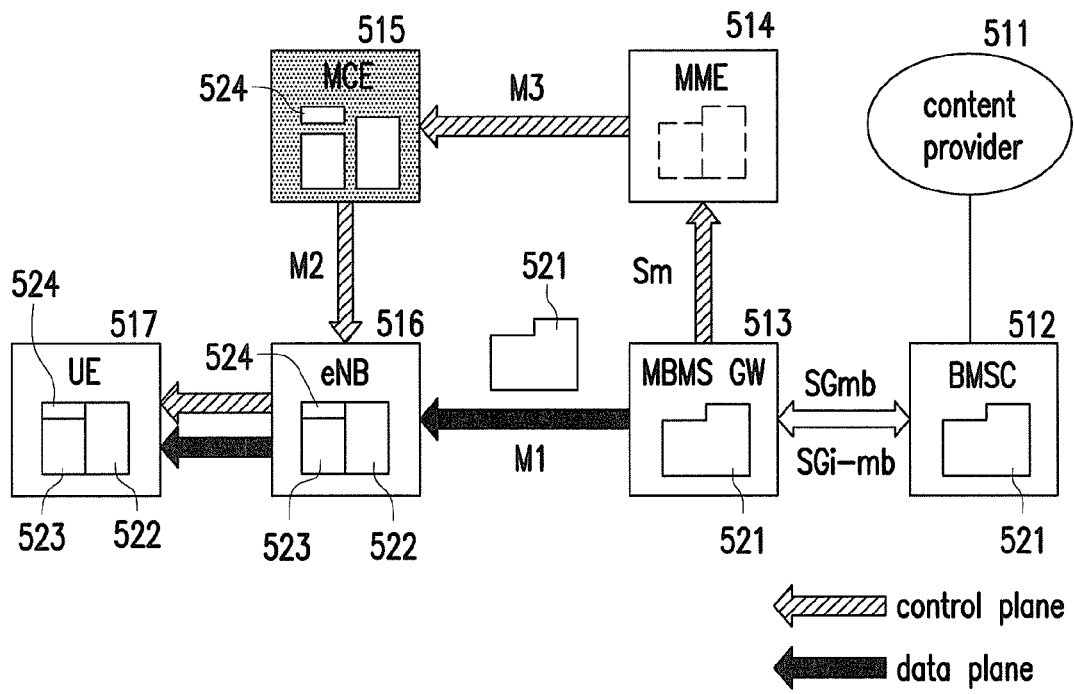
FIG. 5B illustrates the network structure of FIG. 5A.

FIG. 5A illustrates an enhanced MCCH procedure based on a MCE decision in accordance with one of the exemplary embodiments of the present disclosure. FIG. 5B illustrates the network structure of FIG. 5A, and thus FIG. 5A and FIG. 5B would be referred together. This embodiment would be similar to above mentioned embodiments except that the MCE (515) could be considered the decision maker to be described as follows. In step S501, after MBMS data (521) is delivered by the content provider (511) through the MBSC (512) to the MBMS GW (513), all the MBMS data (521) would be delivered to the eNB (516) by the MBMS GW (513) across a user plane such as a M1 interface while control information would be delivered to the MME (514) via a Sm interface and then to MCE (515) via a M3 interface. In step S502, based on the control information, the MCE (515) would reserve space in MCCH data for enhanced data (523), space in MTCH for legacy data (522), and insert MCCH control (524) in MCCH data. For this MCE decision method, since MCE (515) would know the amount of data via the control information from MME, MCE (515) would be in charge of splitting MBMS data into enhanced data (523) and legacy data (522). For legacy data (522), it would reserve space for MTCH as usual, whereas for enhanced data (523), the MCE (515) would reserve space in MCCH data. In step S503, the eNB 516 would receive MBMS data (521) from MBMS GW (513) and MCCH data from the MCE 515, so based on the control information from MCE (515) via M2, the eNB (516) would split the MBMS data (521) into legacy data (522) and enhanced data (523) where the legacy data (522) would be in MTCH and enhanced data (523) would be in MCCH. Then in step S504, the eNB (516) would then deliver the totality of MBMS data (522, 523) with MCCH control (524) to the UE 517.

Figure 6A:
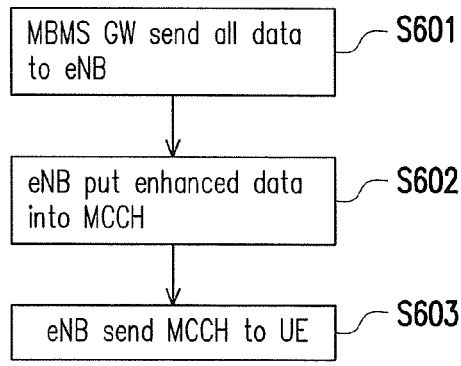
FIG. 6A illustrates an enhanced MCCH procedure based on an eNB decision in accordance with one of the exemplary embodiments of the present disclosure.
Figure 6B:
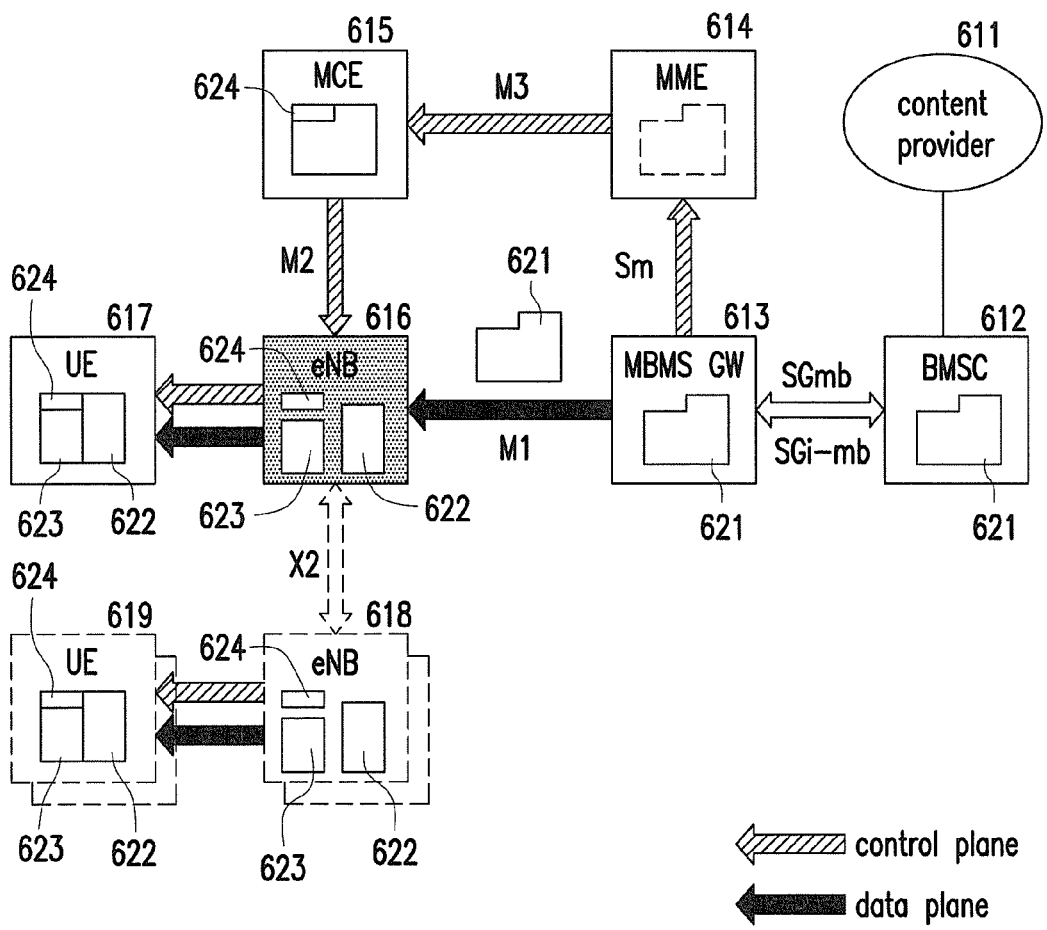
FIG. 6B illustrates the network structure of FIG. 6A.

FIG. 6A illustrates an enhanced MCCH procedure based on an eNB decision in accordance with one of the exemplary embodiments of the present disclosure. FIG. 6B illustrates the network structure of FIG. 6A. Referring to FIG. 6A & FIG. 6B, this embodiment would be similar to aforementioned embodiments except that, the eNB (616) would decide how to split a MBMS data (621) into enhanced data (623) and legacy data (622). In step S601, after the content provider (611) delivers MBMS data (621) to MBMS GW (613) through the BM-SC (612), the MBMS GW (613) would deliver the MBMS data (621) to eNB (616) through the user plane such as a M1 interface and would deliver control information through the control plane such as a Sm interface to MME (614) which then would deliver control information via a M3 interface to the MCE (615). The MCE (615) would transmit MCCH control (624) to one or more eNBs such as the eNB 616 via a M2 interface. In step S602, the eNB (616) would separate the MBMS data (612) into legacy data (622) and enhanced data (623), and then the eNB (616) would place the enhanced data (623) along with MCCH control (624) into MCCH and legacy data (622) into MTCH. For this embodiment, an eNB in general would make the decision to split a MBMS data. The legacy data would be placed in MTCH as usual, but the enhanced data would be placed in MCCH. The eNB (616) would optionally coordinate with other eNBs (618) through an inter-eNB or inter-base station interface such as an X2 interface in the same MBSFN area to add enhanced data into MCCH. In this way, UEs (617, 619) may receive MBMS data in MCCH and also in MTCH.

FIG. 7 illustrates four different control nodes such as a BM-SC, MBMS GW, MCE, and an eNodeB each using a different service identity to split MBMS data into control plane and user plane in accordance with one of the exemplary embodiments of the present disclosure. For example, a BM-SC could use Application Identifier (ID) for service data from Content Provider, and therefore would perform splitting of MBMS data based on applications having particular application IDs. In the same way, a MBMS GW could use MBMS Session identifier (MBMS ID) for service data from BM-SC, a MCE could use M3 signalling connection identifier (ID) for service data from MME, and eNB could use GPRS Tunnelling Protocol User Tunnel Endpoint Identifier (GTP-U TEID) or internet protocol (IP) multicast address for service data from MBMS GW and use M2 signalling connection ID for service data from MCE. Therefore, the decision making would not be exclusively performed by one control element or another, but the duty could be shared by any one or more of the various control nodes as aforementioned based on instantaneous needs or requirements of a network.

The following disclosure relates to the proposed handling of the group based data transmission using MBMS in radio access networks (RAN). In general, a base station or an eNB would receive MCCH control within MCCH from a MCE through the control plane and may receive legacy data from a MBMS GW, if there is any, and receive enhanced data within MCCH from a MCE, if there is any. The base station or eNB would then based on the MCCH control received from MCE reassembles, in totality, the MBMS data which may include enhanced data in MCCH, legacy data in MTCH, and MCCH control in MCCH. The base station or eNB may then transmit MBMS data through a Broadcast Channel (BCH) within which the Broadcast Control Channel (BCCH) would broadcast SystemInformationBlock Type13 (SIB 13) from which a UE may obtain the MBSFN Area ID and MCCH related configuration within MBSFN-AreaInfo. From the MBSFN Area ID, the UE may map to a specific MCCH within which the PMCH-Info list would contain new information elements (IE) which indicates the existence of the enhanced data as well as its location and length which would be optional.

FIG. 8A illustrates the new IE in MCCH Message in accordance with one of the exemplary embodiments of the present disclosure. More specifically, within MBMS-SessionInfo-r9 of PMCH-InfoList of MB SFNAreaConfiguration MCCH message of Radio Resource Control (RRC) signaling for LTE/LTE-A, there would be at least four IEs which could be of interests for a UE, namely, the temporary mobile group identity (TMGI) (e.g. tmgi-r9 (801)) would indicate the ID of an intended group of UEs, the session ID (e.g. sessionID-r9 (802)) would indicate whether the current MBMS data would belong to a particular session, the logical channel identifier (LCID) (e.g. logicalChannelIdentity-r9 (803)) would be used to indicate the type of MBMS data, and the group message IE (e.g. groupMessage-r12 (804)) would contain the content of a group message. More particularly, the groupMessage-r12 (804) would further include two variables, a first variable to indicate the length of the enhanced data in MCCH and a second variable to indicate the content of the enhanced data in MCCH.

Figure 8B:
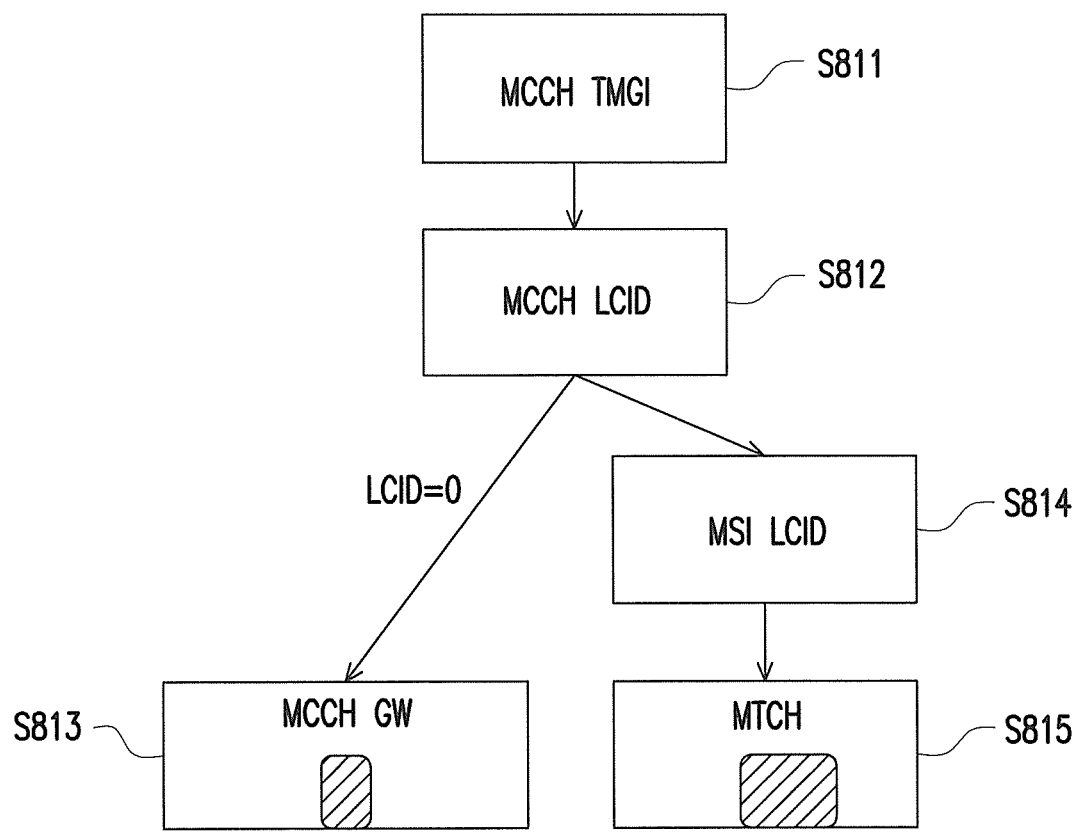
FIG. 8B is a block diagram showing data transfer from the perspective of a UE in accordance with one of the exemplary embodiments of the present disclosure.

FIG. 8B is a block diagram showing data transfer from the perspective of a UE in accordance with one of the exemplary embodiments of the present disclosure. In step S811, a UE would read a TMGI as well as a session ID in MCCH first. In step S812 if the TMGI and the session ID would indicate to a UE that the MBMS which corresponds to the TMGI and the session ID would be of interest for the UE, then the UE would read a LCID in MCCH to determine the type of MBMS data. If the value of LCID is 0, then in step S813 the UE could read the IE in 804 to obtain the location and the content of the enhanced data in MCCH directly. If the value in LCID is between a specific range such as between 1 and 28, in step S814 UE would then would the LCID in MSI to obtain the location of the legacy data in MTCH so as to read the MTCH to obtain the MBMS data in step S815. In this way, the proposed method would support both the enhanced method and the legacy method to transmit MBMS data.

Figure 8C:
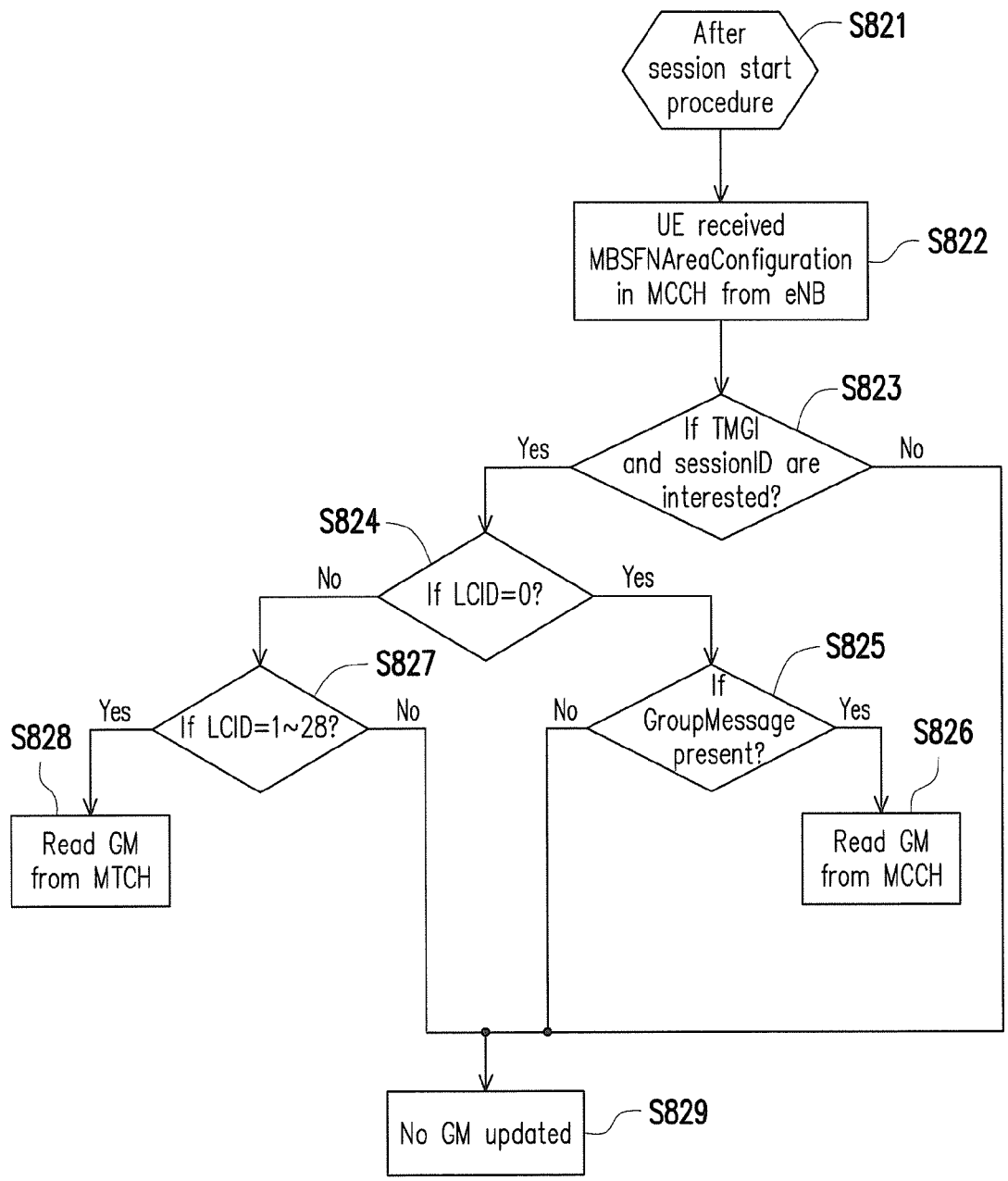
FIG. 8C is a detailed flow chart showing data transfer from the perspective of a UE in accordance with one of the exemplary embodiments of the present disclosure.

FIG. 8C is a detailed flow chart showing data transfer from the perspective of a UE in accordance with one of the exemplary embodiments of the present disclosure. The flow chart would be applicable for LTE-Advanced (LTE-A) as an example. In step S821, it would be assumed that a UE is under MBMS data transfer such that the UE has started receiving data from a base station. In step S822, the UE would decode the MCCH to obtain the IE MBMS-SessionInfo-r9 under MBSFNAreaConfiguration. In step S823, the UE would receive the TMGI and the session ID and determine whether the corresponding MBMS data would be of interested. If no, the procedure would lead to S829 in which the UE would not receive any group message updates. If yes, then in step S824 the UE would check whether the LCID in MCCH would be 0. If the LCID is 0, then in step S825 the UE would check the group message indicator or identifier (804) to determine whether any enhanced data would be present. If yes, then in step S826 the UE would obtain the enhanced data or the group message from MCCH. If back in step s824 the LCID value is not zero, then in step S827 the UE would determine whether the LCID would be between 1 and 28. If yes, then in step S828, the UE would obtain the group message or MBMS data from MTCH after reading the MSI to determine the location of the MBMS data. If no, then step S829 would be executed as no group message would be received.

FIG. 9A illustrates a new MCCH Message for the purpose of placing MBMS data on a control channel in accordance with one of the exemplary embodiments of the present disclosure. For this embodiment, a new MCCH message called MBMSGroupMessage would be defined. The MBMSGroupMessage message would include a new IE GroupMessageInfo-r12 which includes parameters namely TMGI (e.g. 901), sessionID (e.g. 902), LCID (e.g. 903, optional), GroupMessageVersion (e.g. 904, optional), and GroupMessageData (e.g. 905, optional). TMGI would indicate the intended group audience, and the sessionID would indicate the whether the current MBMS data is under the same session. The LCID would assist the UE to determine whether MBMS data is legacy data or enhanced data. GroupMessageVersion (e.g. a version number such as 904) would provide the version of the group message. Since a network may re-transmit the same information, a UE could read the aforementioned variables to determine whether the MBMS data would be of interest for the UE and thus could reduce the unnecessary battery consumption. Especially for GCSE, important messages could be transmitted more than once to allow late entry UEs to receive the important contents. Also a GCSE application server could use the GroupMessageVersion (e.g. 904) to indicate the version of the group message, and based on which the UE could decide whether to obtain the group message or not. If a version changed has been indicated, a UE could read GroupMessageData (e.g. 905) is to obtain the group message or the MBMS data.

Figure 9B:
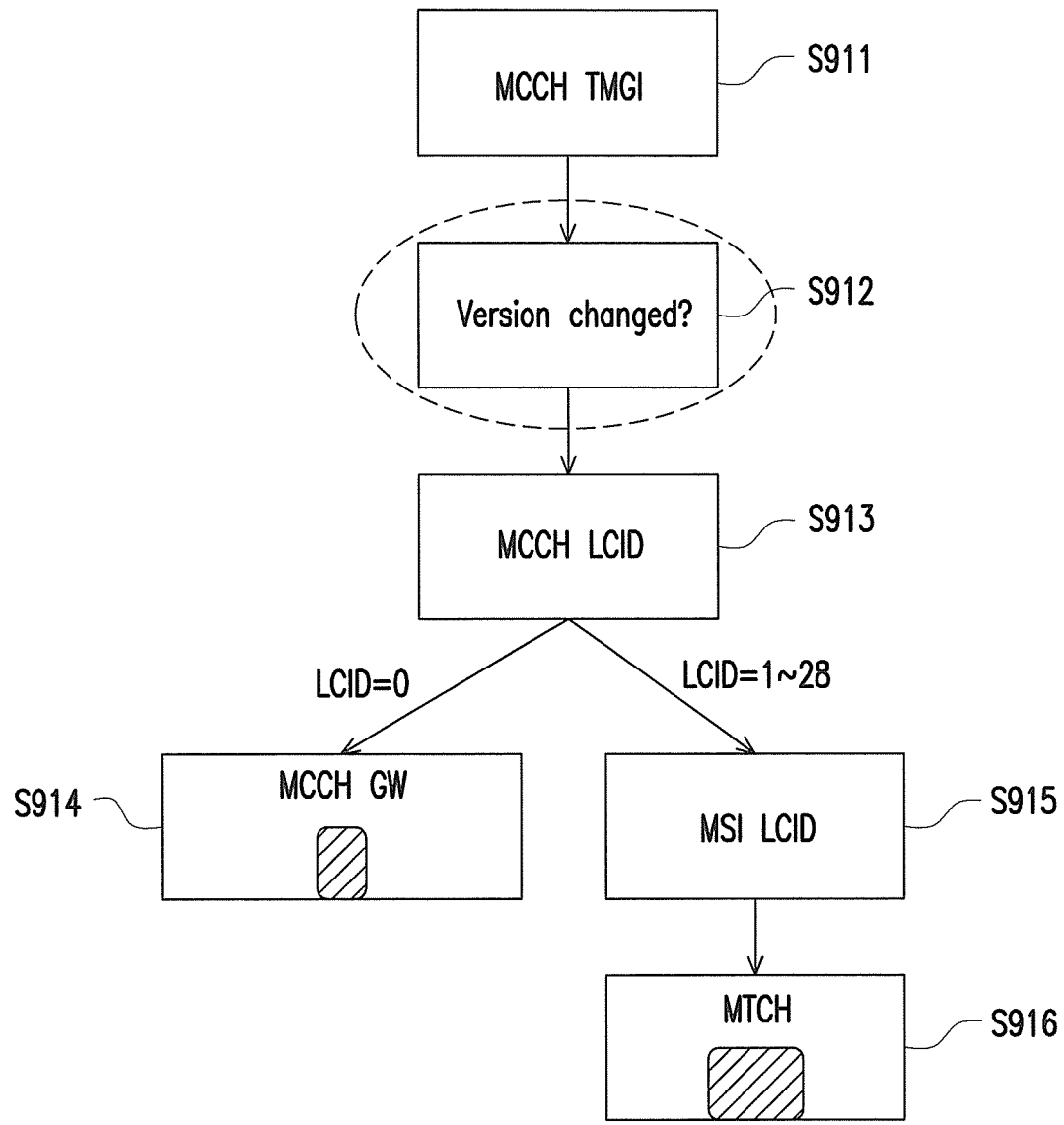
FIG. 9B is a block diagram showing data transfer from the perspective of a UE in accordance with one of the exemplary embodiments of the present disclosure.

FIG. 9B is a block diagram showing data transfer from the perspective of a UE in accordance with one of the exemplary embodiments of the present disclosure. In step S911, a UE would read a TMGI as well as a session ID in MCCH. In step S912, the UE would read the GroupMessageVersion (e.g. 904) to determine whether the version of the currently received MBMS data has been changed. If the MBMS version remained the same, it may signify that the UE has already obtained the MBMS data and would thus not proceed further. If the MBMS version has changed, it may signify that the UE has not obtained the MBMS data before. In step S913, a UE may read the TMGI (e.g. 901) and the session ID (e.g. 902) which would both indicate to the UE that the MBMS which corresponds to the TMGI and the session ID would be of interest for the UE or not, then the UE would read a LCID in MCCH to determine the type of MBMS data. If the value of LCID is 0, then in step S914 the UE could read the IE such as GroupMessageData (e.g. 905) to obtain the location and the content of the enhanced data in MCCH directly. If the value in LCID is between 1 and 28, then in step S915 the UE would then would the LCID in MSI to obtain the location of the legacy data in MTCH so as to read the MTCH to obtain the MBMS data in step S916. In this way, the proposed method would support both the enhanced method and the legacy method to transmit MBMS data.

Figure 9C:
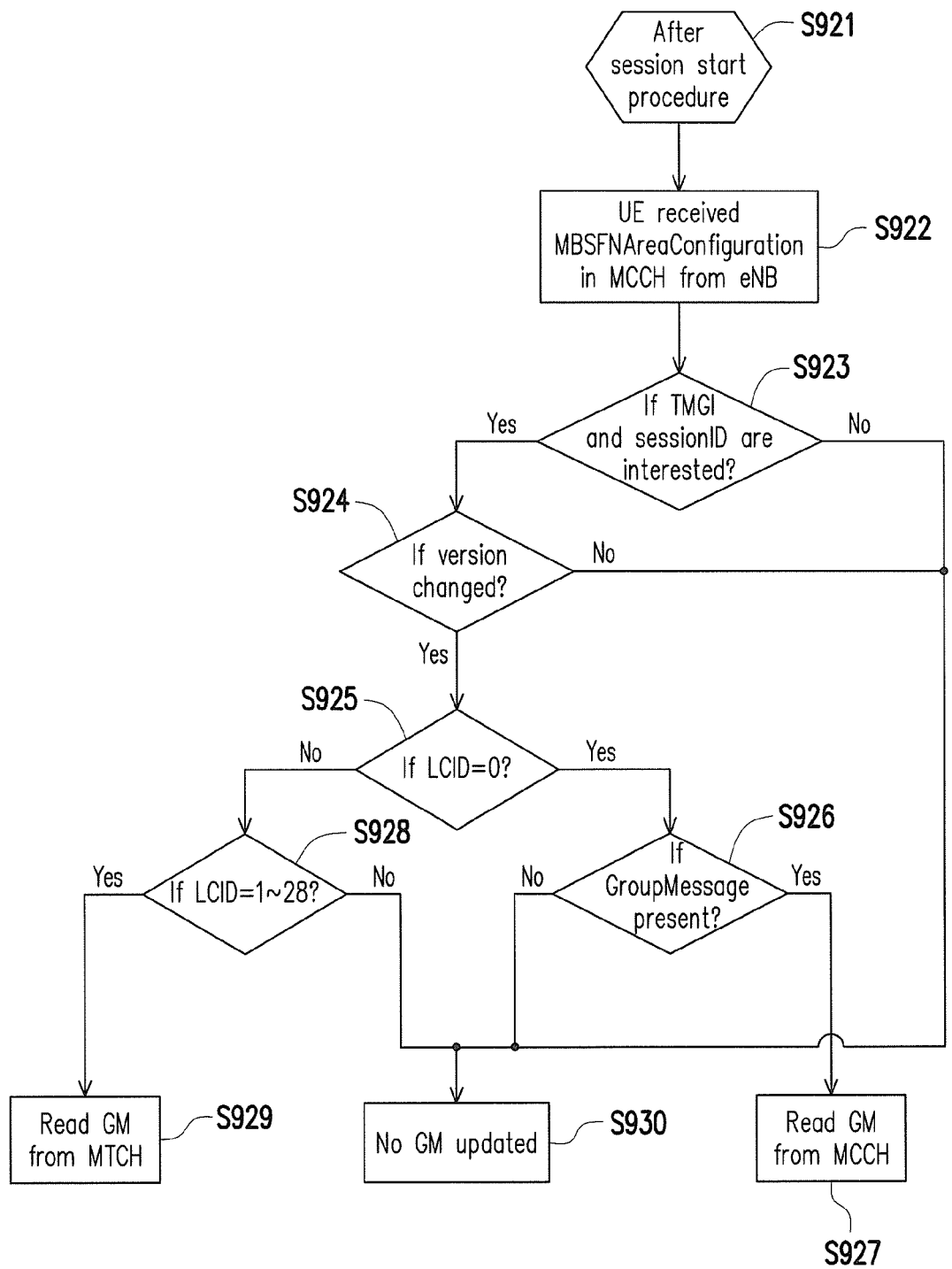
FIG. 9C is a detailed flow chart showing data transfer from the perspective of a UE in accordance with one of the exemplary embodiments of the present disclosure.

FIG. 9C is a detailed flow chart showing data transfer from the perspective of a UE in accordance with one of the exemplary embodiments of the present disclosure. The flow chart would be applicable for LTE-Advanced (LTE-A) as an example. In step S921, it would be assumed that a UE is under MBMS data transfer such that the UE has started receiving data from a base station. In step S922, the UE would decode the MCCH to obtain the IE MBMSGroupMessage. In step S923, the UE would receive the TMGI and the session ID and determine whether the corresponding MBMS data would be of interested. If no, the procedure would lead to S930 in which the UE would not receive any group message updates. If yes, then in step S924 the UE would determine whether the MBMS version has changed. If yes, then the procedure would lead to S925, but otherwise step S930 would be executed. In step S925, the UE would check whether the LCID in MCCH would be 0. If the LCID is 0, then in step S926 the UE would check the groupMessageData (e.g. 905) to determine whether any enhanced data would be present in MCCH. If yes, then in step S927 the UE would obtain the enhanced data or the group message from MCCH. If back in step S925 the LCID value is not zero, then in step S928 the UE would determine whether the LCID would be between 1 and 28. If yes, then in step S929, the UE would obtain the group message or MBMS data from MTCH after reading the MSI to determine the location of the MBMS data. If no, then step S930 would be executed as no group message would be received.

Figure 10:
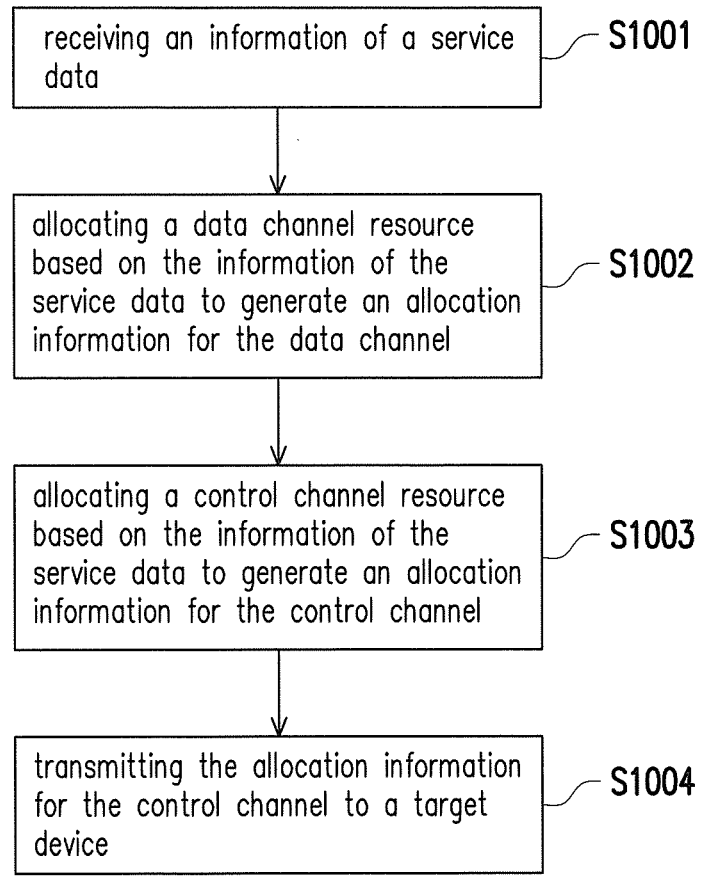
FIG. 10 illustrates an exemplary embodiment of a proposed data transmission method using MBMS from the perspective of a network control node.

FIG. 10 illustrates an exemplary embodiment of a proposed data transmission method which would be group based using a point to multi-point transmission service which could be the MBMS service from the perspective of a network control node. In step S1001, the network control node would receive an information of a first service data and a second service data. The first and second service data could be for example MBMS data target toward a group of UEs within a MBMSN area. The network control node would receive information about the service data such as their size and target location. In step S1002, the network control node would allocate a data channel resource based on the information of the service data to generate an allocation information for the data channel. For example, the network control node could base on the information of the service data to allocate resource in the MTCH to transmit a first service data. In step S1003, the network control node would allocate a control channel resource based on the information of the service data to generate an allocation information for the control channel For example, the network control node could based on the information of the service data to allocate resource in MCCH to transmit a second service data. In step S1004, the network control node would transmit the allocation information for the control channel or the data channel to a target device. The information related to the allocation of resources would be passed on directly to a base station or indirectly through another network control node. Based on the allocation of resource information, the network control node could also divide and place the service data in those allocated resources.

Figure 11:
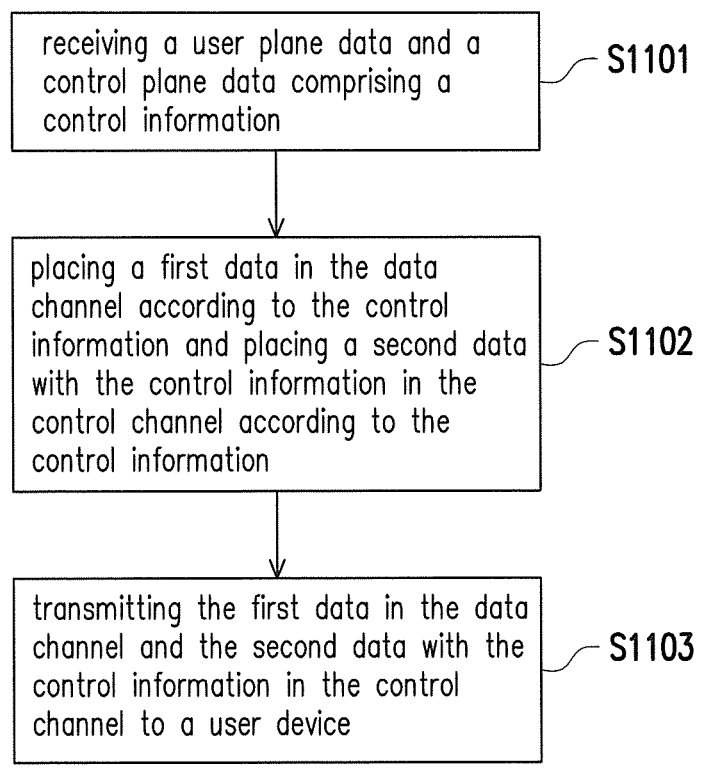
FIG. 11 illustrates an exemplary embodiment of a proposed data transmission method which would be group based using MBMS from the perspective of a base station.

FIG. 11 illustrates an exemplary embodiment of a proposed data transmission method which would be group based using MBMS from the perspective of a base station. In step S1101, the base station would receive a user plane data and a control plane data including a control information In step S1102, the base station would place a first service data in the data channel according to the control information and placing a second service data with the control information in the control channel according to the control information In other words, after receiving data from the user plane and control plane, the base station could place received data into a data channel such as MTCH and also in MCCH based on the control information such as MCCH control received from a MCE. The first service data could originate from the user plane and the second service data could originate from either the user plane or the control plane. In step S1103, the base station could transmit the first service data in the data channel and the second service data with the control information in the control channel to a user device.

Figure 12:
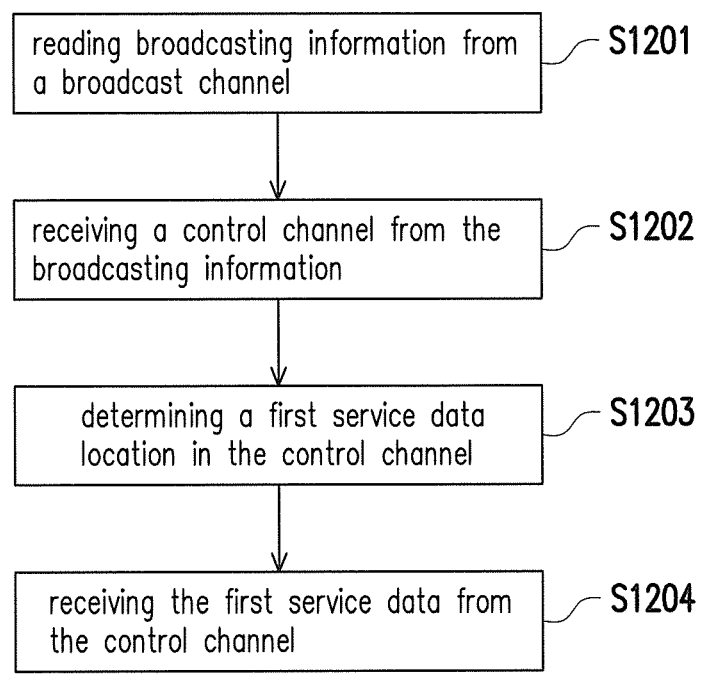
FIG. 12 illustrates an exemplary embodiment of a proposed data transmission method which would be group based using MBMS from the perspective of a user equipment.

FIG. 12 illustrates an exemplary embodiment of a proposed data transmission method which would be group based using MBMS from the perspective of a user equipment. In step S1201, a UE would read broadcasting information from a broadcast channel such as by reading SIB 13 from the BCCH in LTE/LTE A. In step S1202, the UE would receive a control channel (such as MCCH) from the broadcasting information which could be area specific based on the MBSFN area ID. In step S1203, a UE would determine a first service data location in the control channel. In step S1204, the UE would receive the first service data from the control channel. Also the UE could receive a data channel from the broadcasting information, determine a second service data location in the data channel, and receive the second service data from the data channel. It should be noted that the reception of data channel service data and the reception of the control channel service data does not have to occur at the same time but could be received separately or one at a time.

A base station in this disclosure could be considered equivalent to an evolved Node B (eNodeB) in a LTE systems. A base station may also include definitions used in other types of communication networks such as an advanced base station (ABS), a base transceiver system (BTS), an access point, a home base station, a relay station, a repeater, an intermediate node, an intermediary, and/or satellite-based communication base stations.

A network control node is this disclosure could refer to any one of a BM-SC, a MBMS gateway, and a MME in a core network as well as a MCE and an eNB in a radio access network.

From the hardware perspective, a base station or a network control node may include at least but not limited to a transmitter circuit, a receiver circuit, an analog-to-digital (A/D) converter, a digital-to-analog (D/A) converter, a processing circuit, one or more antenna units, and optionally a storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The processing circuit is configured to process digital signal and to perform functions, processes or procedures, or method steps of the proposed method in exemplary embodiments of the present disclosure. Also, the processing circuit may optionally be coupled to a memory circuit to store programming codes, device configurations, a codebook, buffered or permanent data, and etc. . . . The functions of the processing circuit may be implemented using programmable units such as a micro-processor, a micro-controller, a DSP chips, FPGA, etc. The functions of the processing circuit may also be implemented with separate electronic devices or ICs, and the processing circuit may also be implemented with either hardware or software.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

From the hardware perspective, a UE may includes at least but not limited to a transmitter circuit, a receiver circuit, an analog-to-digital (A/D) converter, a digital-to-analog (D/A) converter, a processing circuit, one ore more antenna units, and optionally a memory circuit. The memory circuit may store programming codes, device configurations, buffered or permanent data, codebooks, and etc. . . . The processing circuit may also be implemented with either hardware or software and would be considered to implement the functions, processes or procedures, and method steps of embodiments of the present disclosure. The function of each element of a UE is similar to a control node and therefore detailed descriptions for each element will not be repeated.

In view of the aforementioned descriptions, the present disclosure is able to transmit group based data through a MBMS network efficiently by reducing the transmission latency. This could be accomplished by dividing incoming MBMS data into legacy data and enhanced data which would be transmitting through user plane and control plane respectively. The legacy data would be placed in a data channel (MTCH) and the enhanced data would be placed in a control channel (MCCH). In this way, a user would not be required to read the MCCH first and then MSI before reading user data in MTCH but could otherwise obtain user data directly from MCCH.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

In all the drawings of the present disclosure, a box enclosed by dotted lines would mean an optional functional element or an optional step, and a dotted line may mean that the process flow could be optional or may not necessarily occur.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A data transmission method using a point to multi-point transmission service through a multicast channel which comprises a data channel and a control channel, configured for a network control node or a device with Multi-cell/Multicast Coordination Entity (MCE) functions, and the method comprises:

receiving a service data information, wherein the service data information indicates how a target device receives service data;

determining whether to divide the service data into a first service data which is to be placed in the control channel and a second service data which is to be placed in the data channel according to the service data information;

generating an allocation information for the control channel, wherein the allocation information is related to the first service data which is to be placed in the control channel; and transmitting the allocation information for the control channel to the target device.

2. The method of claim 1 further comprises:
receiving the service data;
dividing, by a Broadcast Multicast Service Center (BM-SC), the service data into the second service data and the first service data according to the service data information.

3. The method of claim 2 further comprises:
transmitting the second service data to a base station through a user plane via a Multimedia Broadcast/Multicast Services gateway (MBMS-GW), wherein the target device is the base station; and
transmitting the first service data to the base station through a control plane via the MBMS-GW, a Mobility Management Entity (MME) and a Multi-cell/Multicast Coordination Entity (MCE).

4. The method of claim 1 further comprises:
receiving the service data;
dividing, by a MBMS-GW, the service data into the second service data and the first service data according to the service data information.

5. The method of claim 4, further comprising:
transmitting the second service data directly to a base station through a user plane, wherein the target device is the base station; and
transmitting the first service data to the base station through a control plane via a MME and a MCE.

6. The method of claim 1, further comprising:
reserving, by the device with MCE functions, space in the data channel for the second service data of the service data according to the service data information; and
reserving, by the device with MCE functions, space in the control channel for the first service data according to the service data information.

7. The method of claim 6, further comprising:
transmitting allocation information of the first service data and the second service data through a control plane to the target device, wherein the target device is a base station.

8. The method of claim 1, wherein the allocation information of the control channel comprises a resource allocation of the service data in multicast control channel (MCCH).

9. The method of claim 1, wherein when the network control node is operated as a BM-SC or a MBMS-GW, a service identity of the service data is an application identifier, a MBMS session identifier, or a M3 signaling connection identifier respectively.

10. The method of claim 1, wherein the network control node comprises a transmitter and a receiver configured to respectively transmit and receive data and a processing unit coupled to the transmitter and the receiver and is configured to execute the functions of claim 1.

11. The method of claim 1, wherein the service data information comprises a size and a target location of the service data.

12. A data transmission method using a point to multi-point transmission service through a multicast channel which comprises a data channel and a control channel, configured for a base station (BS), and the method comprises:

receiving a user plane data and a control plane data comprising a control information;

placing a first data in the data channel according to the control information and placing a second data with the control information in the control channel according to the control information, wherein the control information indicates how a user device receives the first data and the second data;

when the control plane data contains user data in addition to the control info illation, placing the user plane data as the first data in the data channel according to the control information and placing the user data from the control plane data as the second data along with the control information in the control channel; and transmitting the first data in the data channel and the second data with the control information in the control channel to the user device.

13. The method of claim 12, wherein when the control plane data does not contain user data in addition to the control information, the step of placing the first data in the data channel according to the control information and placing the second data with the control information in the control channel according the control information comprising:

dividing the user plane data into the first data and the second data based on the control plane data; and placing the first data in the data channel and placing the second data with the control information in the control channel.

14. The method of claim 12, wherein when the control plane data does not contain user data in addition to the control information, the step of placing the first data in the data channel according to the control information and placing the second data with the control information in the control channel according the control information comprising:

dividing the user plane data into the first data and the second data based on the control information; and placing the first data in the data channel and placing the second data with the control information in the control channel.

15. The method of claim 14 further comprising:
coordinating with a second base station to divide another user plane data into a third data and a fourth data through an inter-base station interface; and
the second base station placing the third data into another data channel and placing the fourth data into another control channel.

16. The method of claim 12, wherein the data channel is a multicast traffic channel (MTCH) and the control channel is a multicast control channel (MCCH).

17. The method of claim 12 further comprising transmitting a system information which maps to the control channel containing a group message indicator indicating existence of the second data in the control channel.

18. The method of claim 17, wherein the group message indicator further indicate a length of the second data in the control channel.

19. The method of claim 18, wherein the group message indicator further contains a version number indicating whether the first data and the second data have been updated.

20. The method of claim 12, wherein placing the first data in the data channel according to the control information and placing the second data with the control information in the control channel according to the control information comprising placing the first data in the data channel according to the control information based on a GPRS Tunnelling Protocol User Tunnel Endpoint Identifier (GTP-U TEID) or an internet protocol (IP) multicast address of a service data from a MBMS GW, and placing the second data with the control information in the control channel based on M2 signaling connection ID from a MC.

21. The method of claim 12, wherein the base station comprises a transmitter and a receiver configured to respectively transmit and receive data and a processing unit coupled to the transmitter and the receiver and is configured to execute the method of claim 12.

22. A data transmission method through a point to multipoint transmission service, configured for a user equipment (UE), and the method comprises:

reading broadcasting information from a broadcast channel;

receiving a control channel from the broadcasting information;

determining a first service data location in the control channel; and receiving the first service data from the control channel.

23. The method of claim 22, wherein the step of receiving the control channel from the broadcasting information further comprises:

receiving a data channel from the broadcasting information;

determining a second service data location in the data channel; and receiving the second service data from the data channel.

24. The method of claim 23 further comprising:

receiving the first service data from the control channel when an indicator in the control channel indicates a first value; and receiving the second service data from the data channel when the indicator in the control channel does not indicate the first value.

25. The method of claim 22, wherein the control channel is multicast control channel (MCCH).

26. The method of claim 24, wherein the indicator is a logical channel identifier (LCID), and when LCID indicates the first value, reading the first service data from the control channel.

27. The method of claim 26, wherein when the LCID does not indicate the first value but a second value, claim 26 further comprises:

determining whether the second value is between a specific range; and reading the second service data from the data channel when the second value falls within the specific range.

28. The method of claim 22, wherein the control channel contains a group message indicator which indicates existence of the first service data in the control channel.

29. The method of claim 28, wherein the group message indicator further indicates a length of the first service data in the control channel.

30. The method of claim 29, wherein the group message indicator further indicates a version number which indicates whether the first service data or the second service data has been updated.

31. The method of claim 22, wherein the UE comprises a transmitter and a receiver configured to respectively transmit and receive data and a processing unit coupled to the transmitter and the receiver and is configured to execute the method of claim 22.

* * * * *